(12) United States Patent
Lee et al.

(10) Patent No.: US 12,026,268 B2
(45) Date of Patent: Jul. 2, 2024

(54) CLOUD SERVER AND METHOD FOR CONTROLLING CLOUD SERVER THEREOF

(71) Applicant: Samsung Electronics Co., Ltd., Suwon-si (KR)

(72) Inventors: Jaepyo Lee, Suwon-si (KR); Jiyoung Song, Suwon-si (KR); Hyein Seo, Suwon-si (KR); Doyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 17/420,023

(22) PCT Filed: Jun. 22, 2021

(86) PCT No.: PCT/KR2021/007816
§ 371 (c)(1),
(2) Date: Jun. 30, 2021

(87) PCT Pub. No.: WO2022/010136
PCT Pub. Date: Jan. 13, 2022

(65) Prior Publication Data
US 2022/0188467 A1 Jun. 16, 2022

(30) Foreign Application Priority Data
Jul. 7, 2020 (KR) .................. 10-2020-0083723

(51) Int. Cl.
*G06F 21/62* (2013.01)
*G06F 21/31* (2013.01)
(Continued)

(52) U.S. Cl.
CPC .......... *G06F 21/6218* (2013.01); *G06F 21/31* (2013.01); *G06F 21/602* (2013.01); *H04L 67/06* (2013.01); *H04L 67/1097* (2013.01)

(58) Field of Classification Search
CPC .... G06F 21/6218; G06F 21/31; G06F 21/602; H04L 67/06; H04L 67/1097
See application file for complete search history.

(56) References Cited

U.S. PATENT DOCUMENTS

| 8,719,445 B2 | 5/2014 | Ko |
| 8,849,761 B2 | 9/2014 | Prahlad et al. |

(Continued)

FOREIGN PATENT DOCUMENTS

| EP | 3 671 495 A1 | 6/2020 |
| KR | 10-2015-0101896 A | 9/2015 |
| KR | 10-1992976 B1 | 6/2019 |

OTHER PUBLICATIONS

International Search Report and Written Opinion dated Oct. 1, 2021, issued in International Patent Application No. PCT/KR2021/007816.

*Primary Examiner* — Hosuk Song
(74) *Attorney, Agent, or Firm* — Jefferson IP Law, LLP

(57) ABSTRACT

A cloud server and a method for controlling thereof are provided. The cloud server comprising a communicator, a storage device that can be accessed by the plurality of security modules, and a processor configured to, based on receiving a request signal of preparation for data transmission and identification information of a user of an external device from the external device through the communicator, acquire security data corresponding to the identification information through one security module among the plurality of security modules, and control the communicator to transmit the security data to the external device, and store the acquired security data in the storage device so that the plurality of security modules can share the security data.

14 Claims, 6 Drawing Sheets

(51) Int. Cl.
  *G06F 21/60*      (2013.01)
  *H04L 67/06*      (2022.01)
  *H04L 67/1097*    (2022.01)

(56) References Cited

U.S. PATENT DOCUMENTS

| | | | |
|---|---|---|---|
| 8,856,910 | B1 | 10/2014 | Rostami-Hesarsorkh et al. |
| 9,509,689 | B1 * | 11/2016 | Teng .................... H04L 63/145 |
| 9,916,456 | B2 * | 3/2018 | O'Hare .................... G06F 9/485 |
| 10,116,700 | B2 | 10/2018 | Ylonen |
| 10,230,736 | B2 | 3/2019 | Banerjee |
| 10,469,457 | B1 | 11/2019 | Sokolov et al. |
| 10,560,517 | B1 * | 2/2020 | Hu ........................ H04L 63/0807 |
| 11,201,913 | B1 * | 12/2021 | Hu ........................... H04L 67/10 |
| 11,310,237 | B2 * | 4/2022 | Spurlock ................. H04L 63/10 |
| 11,336,635 | B2 * | 5/2022 | Park ........................ H04W 4/70 |
| 11,481,504 | B2 * | 10/2022 | Zimmermann ......... G06F 21/64 |
| 2013/0219164 | A1 | 8/2013 | Hamid |
| 2015/0358312 | A1 | 12/2015 | Kancharla et al. |
| 2019/0222566 | A1 | 7/2019 | Trimmer et al. |
| 2019/0297112 | A1 | 9/2019 | Yu et al. |

\* cited by examiner

CLOUD SERVER AND METHOD FOR CONTROLLING CLOUD SERVER THEREOF

CROSS-REFERENCE TO RELATED APPLICATION(S)

This application is a U.S. National Stage application under 35 U.S.C. § 371 of an International application number PCT/KR2021/007816, filed on Jun. 22, 2021, which is based on and claimed priority of a Korean patent application number 10-2020-0083723, filed on Jul. 7, 2020, in the Korean Intellectual Property Office, the disclosure of which is incorporated by reference herein in its entirety.

BACKGROUND

1. Field

The disclosure relates to a cloud server and a method for controlling. More particularly, the disclosure relates to a cloud server that stores data transmitted from an external device while a plurality of security modules share security data, and a method for controlling thereof.

2. Description of Related Art

Secure File Transfer Protocol (SFTP) is a transmission method wherein security has been reinforced compared to the File Transfer Protocol (FTP) method, and security can be maintained by encrypting all transmitted information according to the related art.

Meanwhile, a server that transmits information by the SFTP method independently performed authentication for a user who is going to encrypt and transmit information according to the related art. That is, in case a plurality of SFTP servers constituted a group, management for a user who is stored or managed by each SFTP server was not unified.

Accordingly, even if information for a user was amended in any one SFTP server, information for the user stored in another SFTP server was not amended, and thus there was a limitation that consistency of information for a user managed by each SFTP server was poor.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cloud server that stores security data corresponding to identification information of a user so that a plurality of security modules can share the security data, and stores data transmitted from an external device, and a method for controlling thereof.

Additional aspects will be set forth in part in the description which follows and, in part, will be apparent from the description, or may be learned by practice of the presented embodiments.

In accordance with an aspect of the disclosure, a cloud server including a plurality of security modules is provided. The cloud server includes a communicator including a circuit, a storage device that can be accessed by the plurality of security modules, and at least one processor configured to, based on receiving a request signal of preparation for data transmission and identification information of a user of an external device from the external device through the communicator, acquire security data corresponding to the identification information through one security module among the plurality of security modules, and control the communicator to transmit the security data to the external device, store the acquired security data in the storage device so that the plurality of security modules can share the security data, and based on receiving data to be stored in the cloud server and security data from the external device through the communicator, authenticate the user of the external device based on the received security data and the security data stored in the storage device by using at least one security module among the plurality of security modules, and store the data to be stored in the cloud server in the storage device.

The storage device may comprise a security data storage area allotted so that the plurality of security modules can share the security data, and the at least one processor may store the acquired security data in the security data storage area.

The at least one processor, based on state information of the plurality of respective security modules, may determine a security module to output security data corresponding to the identification information among the plurality of security modules, and may acquire security data corresponding to the identification information by using the determined security module.

The at least one processor, by using the at least one security module, may authenticate the user of the external device based on whether the security data received from the external device and the security data stored in the storage device are matched.

The at least one processor, based on the security data stored in the storage device and the received security data being matched, may identify that the user of the external device was authenticated, and encrypt the data to be stored in the cloud server through the at least one security module, and store the encrypted data in the storage device.

The at least one processor, based on storing the encrypted data in the storage device, may remove the security data stored in the storage device.

The at least one processor, based on the plurality of respective security modules being included in external servers, may control the communicator to transmit the identification information to a first external server including one security module among the plurality of security modules, receives security data corresponding to the identification information from the first external server through the communicator, and store the security data in the storage device, and control the communicator to transmit the received security data to the external device.

The at least one processor, based on receiving the security data and the data to be stored in the cloud server from the external device through the communicator, may control the communicator to transmit the security data and the data to be stored in the cloud server received from the external device to a second external server including at least one of the plurality of security modules, and receive data encrypted by at least one of the plurality of security modules based on the security data stored in the storage device from the second external server, and store the received encrypted data in the storage device.

The at least one processor, based on receiving a request signal of user authentication from the external device through the communicator, may identify whether the user of the external device has authority to transmit data, and based on identifying that the user of the external device has the authority to transmit data, control the communicator to transmit identification information of the user to the external device.

The plurality of respective security modules may comprise modules using Secure File Transfer Protocol (SFTP).

In accordance with another aspect of the disclosure, a method for controlling a cloud server is provided. The method includes a plurality of security modules, and a storage device that can be accessed by the plurality of security modules according to another embodiment of the disclosure may include the operations of, based on receiving a request signal of preparation for data transmission and identification information of a user of an external device from the external device, acquiring security data corresponding to the identification information through one security module among the plurality of security modules, and transmitting the security data to the external device, storing the acquired security data in the storage device so that the plurality of security modules can share the security data, and based on receiving data to be stored in the cloud server and security data from the external device, authenticating the user of the external device based on the received security data and the security data stored in the storage device by using at least one security module among the plurality of security modules, and storing the data to be stored in the cloud server in the storage device.

The storage device may comprise a security data storage area allotted so that the plurality of security modules can share the security data, and wherein the storing of the security data comprises: storing the acquired security data in the security data storage area.

The transmitting may comprise: based on state information of the plurality of respective security modules, determining a security module to output security data corresponding to the identification information among the plurality of security modules; and acquiring security data corresponding to the identification information by using the determined security module.

The authenticating the user of the external device may comprise: by using the at least one security module, authenticating the user of the external device based on whether the security data received from the external device and the security data stored in the storage device are matched.

The authenticating the user of the external device may comprise: based on the security data stored in the storage device and the received security data being matched, identifying that the user of the external device was authenticated, and wherein the storing of the data to be stored in the cloud server in the storage device comprises: encrypting the data to be stored in the cloud server through the at least one security module, and storing the encrypted data in the storage device.

The method may comprise remove the security data stored in the storage device based on the encrypted data being stored in the storage device.

The method may comprise: based on the plurality of respective security modules being included in external servers, transmitting the identification information to a first external server including one security module among the plurality of security modules; receiving security data corresponding to the identification information from the first external server through the communicator, and storing the security data in the storage device; and transmitting the received security data to the external device.

The method may comprise: based on receiving the security data and the data to be stored in the cloud server from the external device through the communicator, transmitting the security data and the data to be stored in the cloud server received from the external device to a second external server including at least one of the plurality of security modules; and receiving data encrypted by at least one of the plurality of security modules based on the security data stored in the storage device from the second external server; and storing the received encrypted data in the storage device.

The method may comprise: based on receiving a request signal of user authentication from the external device through the communicator, identifying whether the user of the external device has authority to transmit data; and based on identifying that the user of the external device has the authority to transmit data, transmitting identification information of the user to the external device.

The solutions to the problems of the present disclosure are not limited to the above-described solutions, and solutions not mentioned will be clearly understood by those of ordinary skill in the art to which the present disclosure belongs from the present specification and accompanying drawings will be able.

Advantageous Effects

Through the aforementioned various embodiments of the disclosure, a cloud server controls a plurality of security modules to share security data corresponding to identification information of a user who is going to transmit data, and accordingly, management of security data among security modules can be unified.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

Figure 1:
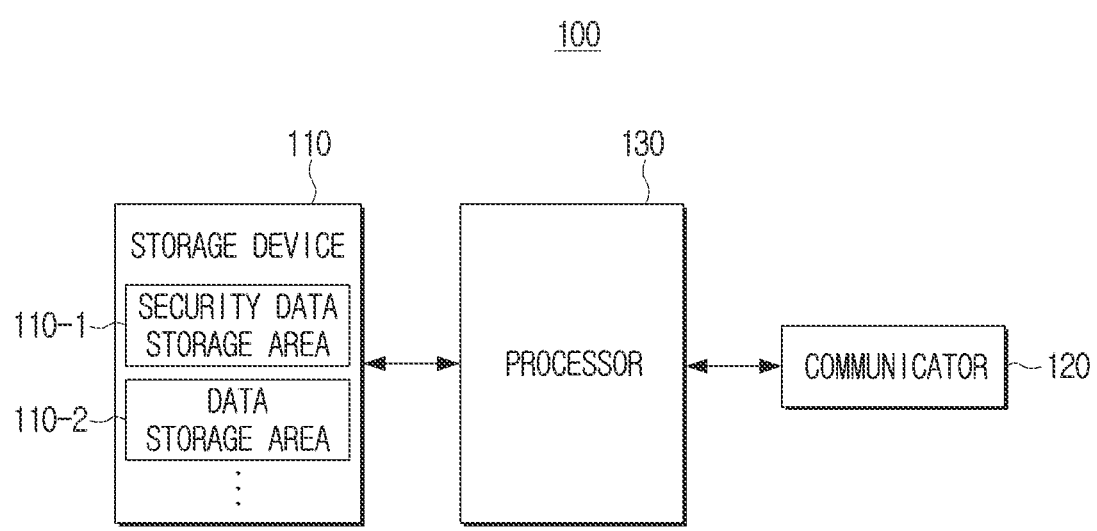
FIG. 1 is a block diagram illustrating a configuration of a cloud server according to an embodiment of the disclosure.

Terms used in this specification will be briefly described, and the present disclosure will be described in detail.

The terms used in the embodiments of the present disclosure are selected as currently widely used general terms as possible while considering the functions in the present disclosure, which may vary depending on the intention or precedent of a person skilled in the art, the emergence of new technology, etc. In addition, in a specific case, there is a term arbitrarily selected by the applicant, and in this case, the meaning will be described in detail in the description of the corresponding disclosure. Therefore, the terms used in the present disclosure should be defined based on the meaning of the term and the contents of the present disclosure, rather than the simple name of the term.

Embodiments of the present disclosure may apply various transformations and may have various embodiments, and specific embodiments will be illustrated in the drawings and described in detail in the detailed description. However, this is not intended to limit the scope of the specific embodiments, and it should be understood to include all transformations, equivalents and substitutions included in the disclosed spirit and scope. In describing the embodiments, if it is determined that a detailed description of a related known technology may obscure the subject matter, the detailed description thereof will be omitted.

Terms such as first, second, etc. may be used to describe various components, but the components should not be limited by the terms. The terms are used only for the purpose of distinguishing one component from another.

The singular expression includes the plural expression unless the context clearly dictates otherwise. In the present application, terms such as "comprises" or "consisting of" are intended to designate that the features, numbers, steps, operations, components, parts, or combinations thereof described in the specification exist, and are intended to indicate that one or more other. It is to be understood that this does not preclude the possibility of addition or presence of features or numbers, steps, operations, components, parts, or combinations thereof.

Hereinafter, with reference to the accompanying drawings, embodiments of the present disclosure will be described in detail so that those of ordinary skill in the art to which the present disclosure pertains can easily implement them. However, the present disclosure may be implemented in several different forms and is not limited to the embodiments described herein. And in order to clearly explain the present disclosure in the drawings, parts irrelevant to the description are omitted, and similar reference numerals are attached to similar parts throughout the specification.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure relates to a cloud server including a plurality of security modules that share security data corresponding to identification information of a user of an external device, and a method for controlling thereof. A security module is a module that encrypts data and makes the data transmitted to a storage device in a cloud server or various types of devices. For example, a security module may be a module that transmits or shares encrypted data by using Secure File Transfer Protocol (SFTP), but this is merely an embodiment, and a security module may be a module that uses various protocols such as FTP Secure (FTPS).

Hereinafter, the disclosure will be described in detail with reference to the drawings.

FIG. 1 is a block diagram for illustrating a configuration of a cloud server 100 according to an embodiment of the disclosure.

Referring to FIG. 1, a cloud server 100 may include a storage device 110, a communicator 120, and a processor 130. However, the components illustrated in FIG. 1 are an illustrative diagram for implementing the embodiments of the disclosure, and appropriate hardware and software components of a level obvious to a person skilled in the art may be additionally included in the cloud server 100.

The storage device 110 may store instructions or data related to at least one other component of the cloud server 100. Also, the storage device 110 may be accessed by the processor 130, and reading/recording/correcting/deleting/updating, etc. of data by the processor 130 may be performed. Further, some areas of the storage device 110 may be accessed by a plurality of security modules.

Meanwhile, the storage device 110 may be implemented as a non-volatile memory, a volatile memory, a flash-memory, a hard disk drive (HDD) or a solid state drive (SSD), etc. Also, in the disclosure, the term 'storage device' may include a memory, a ROM (not shown) inside the processor 130, a RAM (not shown) or a memory card (not shown) (e.g., a micro SD card, a memory stick) installed on the cloud server 100. Further, the storage device 110 may be implemented as one device, but the disclosure is not limited thereto, and the storage device 110 may be implemented as a plurality of devices.

Also, the storage device 110 may store a user identification (ID) of a user pre-registered in the cloud server 100 and a password corresponding to the user ID. It is obvious that a user ID or a password can be corrected/added/deleted according to a user instruction. The feature that a user is registered in the cloud server 100 means that a user ID and a password thereof that can identify a user who has authority to store data is stored in the cloud server 100.

Meanwhile, as illustrated in FIG. 1, the storage device 110 may include a security data storage area 110-1 and a data storage area 110-2. Here, the security data storage area 110-1 is a storage area allotted so that a plurality of security modules can share security data in the storage device 110. Accordingly, the plurality of security modules may access the security data storage area 110-1 and load or utilize the stored security data.

Also, in the security data storage area 110-1, security data and identification information corresponding to the security data may be stored. In this case, the plurality of security modules may access the security data storage area 110-1 and identify security data corresponding to specific identification information, and load the identified security data.

In addition, the storage device 110 may include a data storage area (or, a cloud storage area) 110-2. The data storage area 110-2 is a storage area allotted for storing data transmitted from an external device in the storage device 110. When a user of an external device is authenticated, the processor 130 may store data to be stored in the cloud server that was received from the external device through at least one security module in the data storage area 110-2. Here, the data stored in the data storage area 110-2 may be data encrypted by the plurality of security modules.

Meanwhile, the storage device 110 may be provided inside the cloud server 100, but it may also be provided outside and electronically connected with the cloud server 100. Also, the storage device 110 may be provided outside and communicatively connected with the cloud server 100 through a wired/wireless interface (e.g., Wi-Fi, Bluetooth, a local area network (LAN), etc.). Here, the processor 130 may control the communicator 120 to transmit various types of data (e.g., data encrypted by the plurality of security modules, etc.) to the storage device 110 provided outside.

In FIG. 1, it is illustrated that the security data storage area 110-1 and the data storage area 110-2 are respectively allotted in one storage device 110, but the disclosure is not limited thereto. That is, the security data storage area 110-1 and the data storage area 110-2 may be implemented as areas allotted in separate storage devices, or separate storage devices themselves.

The communicator 120 may include a circuit, and perform communication with an external device (not shown) or various types of devices. In particular, the communicator 120 may receive a request signal of preparation for data transmission and a request signal of user authentication from an external device. Also, the communicator 120 may receive identification information from the external device, and transmit security data corresponding to the identification information to the external device. Then, the communicator 120 may receive data to be stored in the cloud server from the external device.

Meanwhile, the communicator 120 may perform communication with the storage device 110 provided outside the cloud server 100 and transmit/receive various kinds of data. Also, the communicator 120 may receive security data or encrypted data output by a security module included in an external server. Then, the communicator 120 may transmit the data to be stored in the cloud server 100 and security data received from the external device to the external server including the security module.

Meanwhile, the communicator 120 may include various communication modules for performing communication with an external device or various kinds of devices. As an example, the communicator 120 may include a wireless communication module, and for example, it may include a cellular communication module using at least one of LTE, LTE Advance (LTE-A), 5G, code division multiple access (CDMA), wideband CDMA (WCDMA), a universal mobile telecommunications system (UMTS), wireless broadband (WiBro), or a global system for mobile communications (GSM). However, the disclosure is not limited thereto, and the communicator 120 may include various communication modules.

Also, the communicator 120 may include a wired communication module, and for example, it may include at least one of a universal serial bus (USB), a high definition multimedia interface (HDMI), a recommended standard 232 (RS-232), power line communication, or a plain old telephone service (POTS). A network wherein wireless communication or wired communication is performed may include a telecommunication network, for example, at least one of a computer network (e.g.: a LAN or a WAN), the Internet, or a telephone network.

The processor 130 may be electronically connected with the storage device 110 provided inside the cloud server 100 or connected with the storage device 110 provided outside through the communicator 120, and thereby control the overall operations or functions of the cloud server 100. In FIG. 1, it is illustrated that there is one processor 130, but this is merely an embodiment, and there may be two or a plurality of processors 130.

In particular, when a request signal of user authentication is received from an external device through the communicator 120, the processor 130 may identify whether the user of the external device has authority to transmit data based on information included in the request signal of user authentication and information stored in the storage device 110. For example, if a request signal of user authentication including user information (e.g., a user identification (ID) and a password corresponding to the user ID) is received from an external device 10 through the communicator 120, the processor 130 may identify whether the user ID and the password corresponding thereto included in the request signal of user authentication correspond to the user ID and the password thereof stored in the storage device 110. If the user ID and the password thereof included in the request signal of user authentication correspond to the user ID and the password thereof stored in the storage device 110, the processor 130 may identify that the user of the external device has authority to transmit data.

Then, if it is identified that the user of the external device has authority to transmit data, the processor 130 may control the communicator to transmit identification information of the user to the external device. Here, the identification information of the user is unique information of the user by which the user who has authority to transmit data to the cloud server 100 can be identified. The identification information of the user may be implemented in the form of a token including unique information of the user. The external device may transmit a request signal of preparation and the identification information of the user including the unique information of the user to the cloud server 100 for storing data in the cloud server 100.

Meanwhile, when the request signal of preparation for data transmission and the identification information of the user of the external device are received from the external device through the communicator 120, the processor 130 may acquire security data corresponding to the identification information through one security module among the plurality of security modules.

The processor 130 may determine one of the plurality of security modules as a module to output security data. Specifically, through an allocation module (or, a load balancer module), the processor 130 may determine a security module to output security data corresponding to the identification information among the plurality of security modules based on state information of the plurality of respective security modules.

For example, through the allocation module, the processor 130 may determine a security module which has the lowest traffic or load or has the highest resource among the plurality of security modules as the security module to output security data corresponding to the identification information.

As another example, through the allocation module, the processor 130 may determine a security module which has the lowest traffic among the remaining security modules excluding security modules wherein an error occurred among the plurality of security modules as the security module to output security data. However, this is merely an embodiment, and the processor 130 may randomly determine one module among the plurality of security modules.

Then, the processor 130 may acquire security data corresponding to the identification information by using the determined security module. Specifically, through the determined security module, the processor 130 may acquire security data corresponding to the unique information of the user included in the identification information. For example, through the security module, the processor 130 may generate random data that was generated by using a random number generator, and identify the generated random data as the security data corresponding to the unique information of the user included in the identification information.

As another example, through the security module, the processor 130 may acquire unique security data corresponding to the identification information by applying a predefined algorithm to the unique information of the user. As still another example, the processor 130 may acquire security data corresponding to the identification information by using a representational state transfer (REST) application programming interface (API) module included in the security module implemented as an SFTP module.

However, the processor 130 may acquire security data corresponding to the identification information by various methods, not limited to the aforementioned methods. Meanwhile, the security data may be a password corresponding to the identification information of the user for storing data in the cloud server 100 by using the security module. For example, in case the security module is a module using SFTP, the security data may be a password for using SFTP.

The processor 130 may transmit the acquired security data to the external device. Accordingly, the external device may acquire identification information for transmitting the security data to the cloud server 100 and security data corresponding to the identification information by using the security module.

Then, the processor 130 may store the acquired security data in the storage device 110 so that the plurality of security modules can share the security data, and in particular, the processor 130 may store the security data in the security data storage area 110-1 in the storage device 110. The remaining security modules excluding the security module determined by the processor 130 among the plurality of security modules may also access the security data storage area 110-1 and load security data.

Meanwhile, the feature that the security data corresponding to the identification information of the user was stored in the security data storage area 110-1 may mean that the user corresponding to the security data was registered as a user who can store data in the cloud server 100 by using a security module. Accordingly, no matter to which security module the cloud server 100 transmits the data received from the external device 10, each security module may authenticate a user based on the shared security data corresponding to the user of the external device 10, and the authenticated user may encrypt the transmitted data and store the data in the cloud server 100.

When data to be stored in the cloud server 100 and security data are received from the external device through the communicator 120, the cloud server 100 may authenticate the user of the external device based on the received security data and the security data stored in the storage device by using at least one security module among the plurality of security modules, and store the data to be stored in the cloud server 100 in the storage device. Here, the processor 130 may receive identification information together with the security data from the external device through the communicator 120.

Specifically, when identification information is received together with the security data from the external device through the communicator 120, the processor 130 may encrypt the data received from the external device through the allocation module, and determine at least one security module among the plurality of security modules as the module to store the encrypted data in the data storage area 110-2. Then, through the determined at least one security module, the processor 130 may authenticate the user of the external device based on whether the security data received from the external device and the security data stored in the security data storage area 110-1 are matched.

More specifically, the processor 130 may control the determined at least one security module to access the security data storage area 110-1 and load security data corresponding to the stored identification information. That is, the remaining security modules excluding the security module that output security data corresponding to the identification information among the plurality of security modules may also access the security data storage area 110-1 and load security data, and thus the remaining security modules may also perform a user authentication operation based on the stored security data.

Then, through the at least one security module, the processor 130 may identify whether the loaded security data and the security data received from the external device are matched. In case the loaded security data and the security data received from the external device are matched, the processor 130 may identify that the user of the external device was authenticated.

When the user of the external device is authenticated, the processor 130 may encrypt the received data to be stored in the cloud server 100 through the determined at least one security module, and store the encrypted data in the data storage area 110-2 in the storage device 110.

Then, when the data encrypted through the at least one security module is stored in the data storage area 110-2 in the storage device 110, the processor 130 may remove the security data corresponding to the identification information stored in the storage device 110. Accordingly, the cloud server 100 can maintain the security of the information of the user who transmitted data.

Meanwhile, according to an embodiment of the disclosure, the plurality of security modules may not be included in the cloud server 100, but they may be included in an external server. Here, the processor 130 may control the communicator 120 to transmit identification information of the user of the external device to a first external server including one security module among the plurality of security modules. As an embodiment of determining one of the plurality of security modules was described earlier, overlapping explanation will be omitted. Then, the processor 130 may receive the security data corresponding to the identification information from the first external server including a security module through the communicator 120, and store the received security data in the storage device. Then, the processor 130 may store the security data in the external device.

Then, when the security data and the data to be stored in the cloud server are received from the external device through the communicator 120, the processor 130 may control the communicator 120 to transmit the security data and the data to be stored in the cloud server 100 received from the external device to a second external server including at least one of the plurality of security modules. Here, the first external server and the second external server may be the same external server, but this is merely an embodiment, and they may be implemented as different external servers.

Then, the processor 130 may receive data encrypted by at least one of the plurality of security modules based on the security data stored in the storage device 110 from the second external server, and store the received encrypted data in the data storage area 110-2 in the storage device. Here, the security module included in the second external server may access the security data storage area provided inside the cloud server 100 or located outside the cloud server 100 and load the prestored security data. Then, the security module may match the security data received from the external device and the prestored security data, and authenticate the user of the external device.

Meanwhile, in case the first security module and the second security module among the plurality of security modules are respectively included in different external servers, the processor 130 may control the communicator 120 to transmit security data received from the external device to the respective different external servers. At the same time as this or within a threshold time range, the communicator 120 may respectively transmit some of the data to be stored in the cloud server 100 to the respective different external servers. Here, the security module included in each of the external servers may access the security data storage area provided inside the cloud server 100 or located outside the cloud server 100, and load the prestored security data.

Meanwhile, according to another embodiment of the disclosure, a security module may not be included in the cloud server 100, but a security server performing the same operation as the aforementioned operation performed by a security module may separately exist. An embodiment as above will be described in detail with reference to FIG. 4.

Also, the processor 130 may include one or more of a central processing unit (CPU) processing digital signals, a micro controller unit (MCU), a micro processing unit (MPU), a controller, an application processor (AP), or a communication processor (CP), and an ARM processor, or may be defined by the terms. Further, the processor 130 may be implemented as a system on chip (SoC) having a processing algorithm stored therein or large scale integration (LSI), or in the form of a field programmable gate array (FPGA). The processor 130 may perform various functions by executing computer executable instructions stored in the storage device 110. In addition, for performing an artificial intelligence function, the processor 130 may include at least one of a graphics-processing unit (GPU), a neural processing unit (NPU), or a visual processing unit (VPU), which is a separate AI-dedicated processor.

Figure 2A:
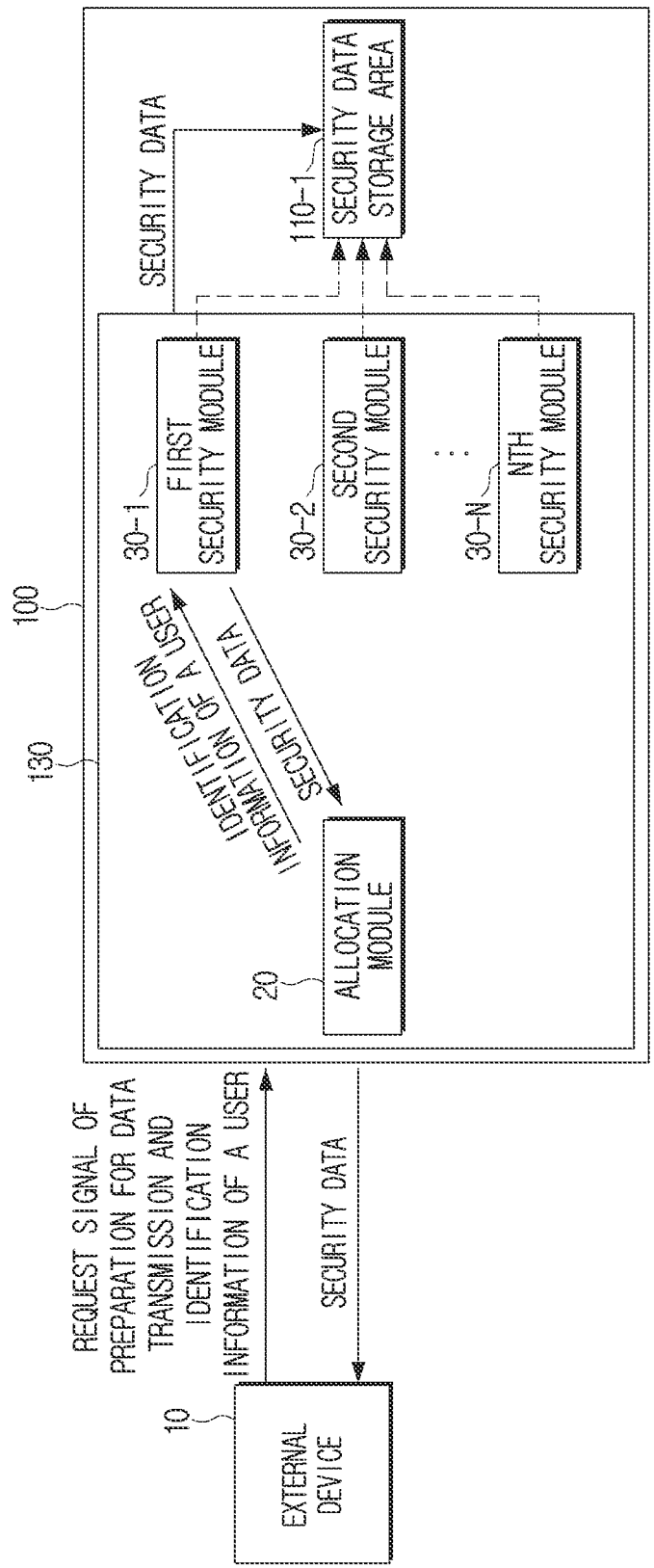
FIG. 2A is a diagram for illustrating a process wherein a cloud server acquires and manages security data corresponding to identification information according to an embodiment of the disclosure.
Figure 2B:
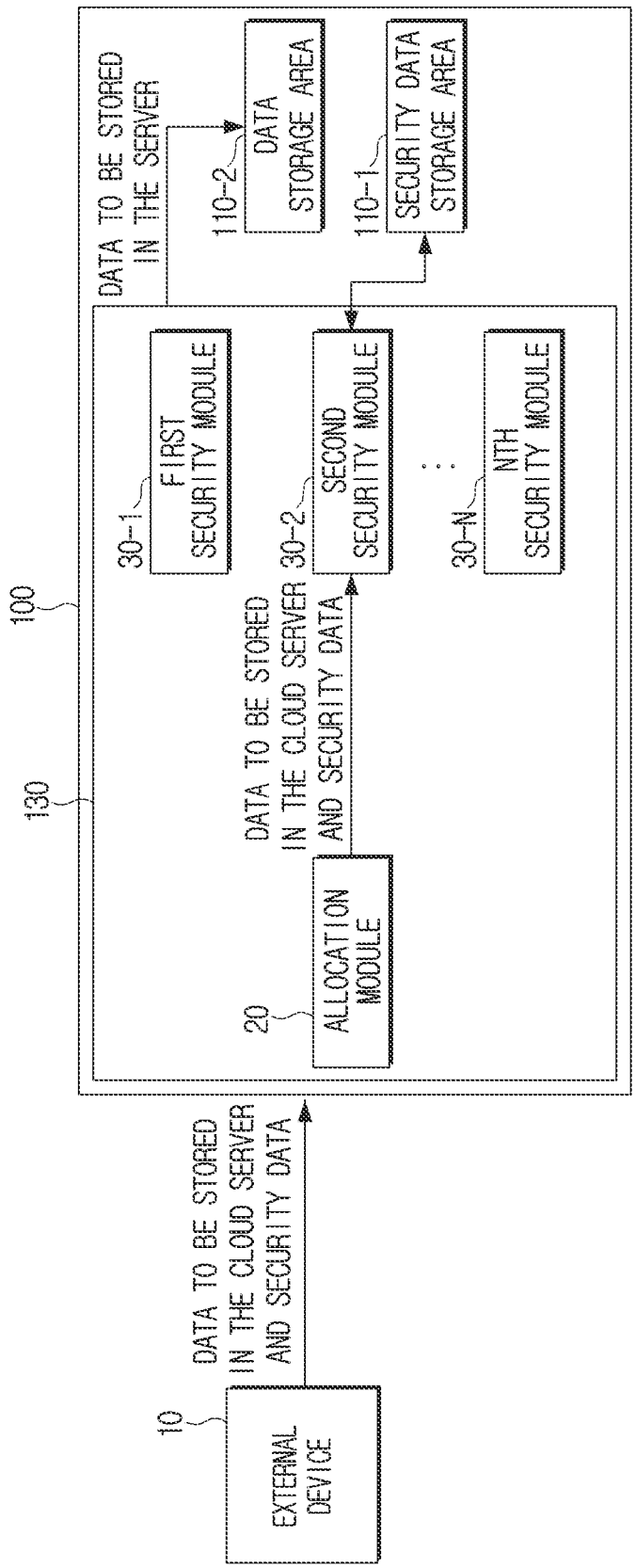
FIG. 2B is a diagram for illustrating a process wherein a cloud server stores data transmitted from an external device according to an embodiment of the disclosure.

FIGS. 2A and 2B are diagrams for illustrating a process wherein a cloud server stores data received from an external device according to various embodiments of the disclosure.

Referring to FIG. 2A, a cloud server 100 may receive a request signal for data transmission and identification information of the user from the external device 10. As the process wherein the external device 10 receives identification information of the user from the cloud server 100 was explained with reference to FIG. 1, overlapping explanation will be omitted.

When the request signal for data transmission and the identification information of the user are received, the cloud server 100 may determine a security module to output security data corresponding to the identification information among the plurality of security modules 30-1, 30-2, . . . 30-N through the allocation module 20. Specifically, through the allocation module, the cloud server 100 may determine a security module to output security data based on the state information of the respective security modules (e.g., the traffic amounts and the resource usage amounts of the security modules, whether an error exists, etc.).

Then, in case the first security module 30-1 was determined as the security module to output security data, the cloud server 100 may acquire security data corresponding to the identification information of the user through the first security module 30-1. For example, the cloud server 100 may randomly generate a password corresponding to the identification information.

Then, the cloud server 100 may store the acquired security data in the security data storage area 110-1 in the storage device 110 so that the plurality of security modules 30-1, 30-2, . . . 30-N can share the security data. Accordingly, the plurality of security modules 30-1, 30-2, . . . 30-N may access the security data storage area 110-1 and share the stored security data. That is, the cloud server 100 may store the security data in the security data storage area 110-1, and accordingly, the cloud server 100 may register a user corresponding to the security data as a user who can encrypt various kinds of data and store the data in the cloud server 100 by using a security module. Meanwhile, as illustrated in FIG. 2A, the security data storage area 110-1 may be provided inside the cloud server 100, but this is merely an embodiment, and it may be a storage area allotted to a separate external device.

Then, the cloud server 100 may transmit the security data acquired through the first security module 30-1 to the external device 10. Accordingly, the external device 10 may acquire identification information necessary for storing data in the cloud server 100 and security data corresponding to the identification information through the plurality of security modules.

Meanwhile, the cloud server 100 may further include an inputter (not shown) for receiving inputs of user instructions. For example, the inputter may be implemented as specific hardware including a circuit. The processor 130 may receive a user instruction for controlling the operation of the cloud server 100 through the inputter. The inputter may include a touch sensor, a (digital) pen sensor, a pressure sensor, a key, or a microphone. The touch sensor may use, for example, at least one method between a capacitive method and a decompressive method. In particular, the inputter may receive an input of a user instruction for correcting an algorithm through which a security module encrypts data.

Referring to FIG. 2B, a cloud server 100 may receive data to be stored in the cloud server 100 and security data from an external device. Here, the cloud server 100 may receive identification information corresponding to the security data together. Then, through the allocation module 20, the cloud server 100 may determine at least one security module among the plurality of security modules 30-1, 30-2, . . . 30-N. Specifically, the cloud server 100 may determine at least one allocation module based on the state information of the plurality of respective security modules through the allocation module 20. In FIG. 2B, it is illustrated that one second security module was determined, but this is merely an embodiment, and the cloud server 100 may determine two or more security modules. In case two or more security modules were determined, the cloud server 100 may divide the data to be stored in the cloud server 100 and transmit the data respectively to the two or more security modules.

Through the second security module 30-2, the cloud server 100 may authenticate the user of the external device 10 based on the security data received from the external device 10 and the security data stored in the security data storage area 110-1. Specifically, through the second security module 30-2, the cloud server 100 may access the security data storage area 110-1 and load security data corresponding to the stored identification information. Then, through the second security module 30-2, the cloud server 100 may match the security data received from the external device and the loaded security data. In case the loaded security data and the received security data are matched, the cloud server 100 may identify that the user of the external device 10 was authenticated. Then, the cloud server 100 may encrypt the data to be stored in the cloud server 100 through the at least one security module, and store the encrypted data in the data storage area 110-2.

Meanwhile, in case two or more security modules among the plurality of security modules were determined by the cloud server 100, the two or more security modules may respectively access the security data storage area 110-1 and load security data corresponding to the identification information. Accordingly, the determined two or more security modules may respectively authenticate the user of the external device 10 based on the loaded data, and encrypt some of the data to be stored in the cloud server 100 and store it in the data storage area 110-2.

Figure 3:
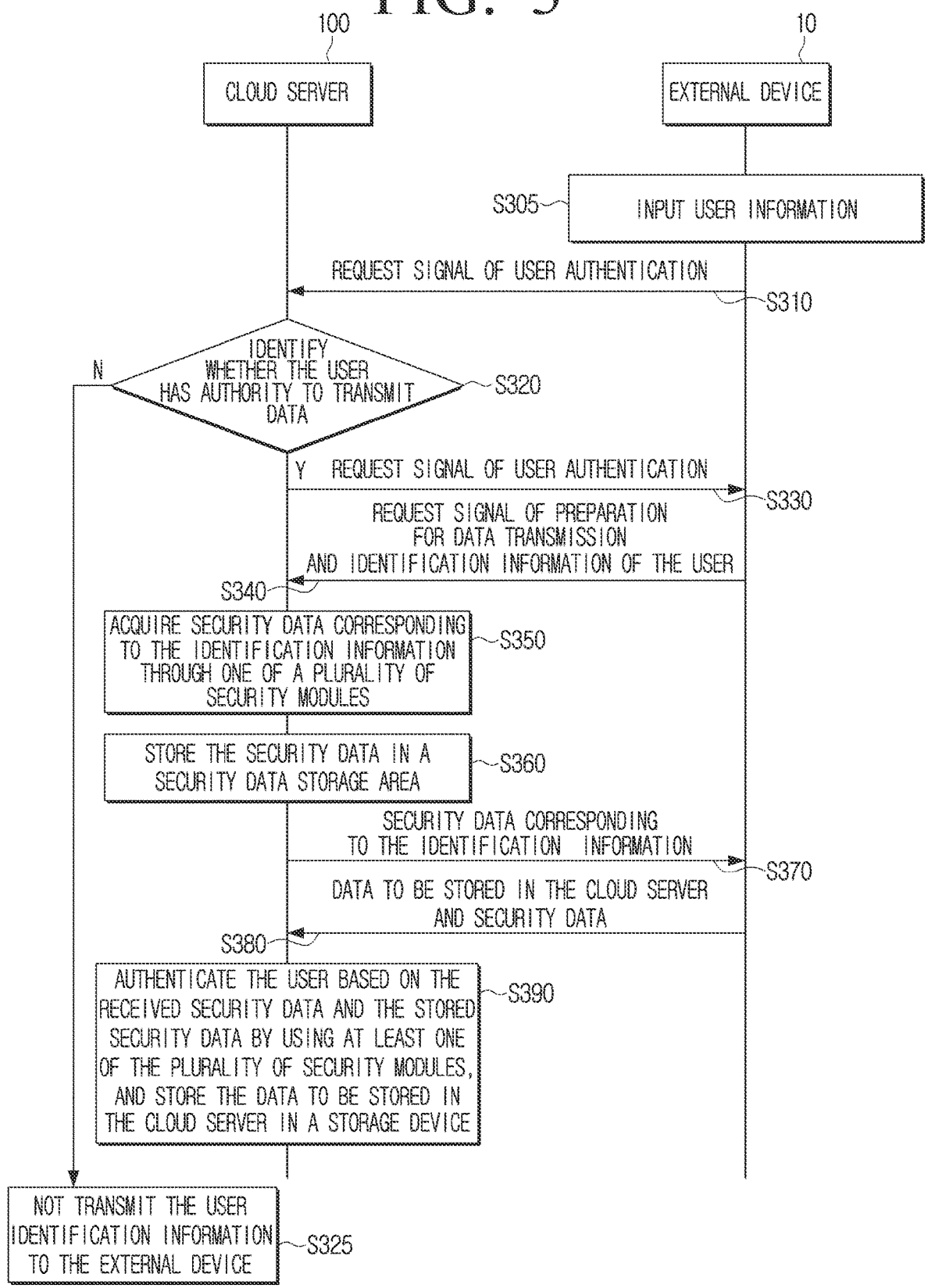
FIG. 3 is a sequence diagram for illustrating an operation of a cloud server according to an embodiment of the disclosure.

FIG. 3 is a sequence diagram for illustrating an operation of a cloud server and an operation of an external device according to an embodiment of the disclosure.

Referring to FIG. 3, an external device 10 may receive an input of user information from a user in operation S305. Here, the user information input from the user may be a user ID and a password corresponding to the user ID pre-registered in the cloud server 100. The external device 10 may transmit a request signal of user authentication including the input user information to the cloud server 100 in operation S310. When the request signal of user authentication is received from the external device 10, the cloud server 100 may identify whether the user of the external device 10 has authority to transmit data in operation S320. Specifically, the cloud server 100 may identify whether the user has authority to transmit data according to whether the user ID and the password corresponding to the user ID included in the request signal of user authentication are pre-registered. If the user ID and the password corresponding to the user ID received are not pre-registered and it is identified that the user does not have authority to transmit data, the cloud server 100 may not transmit identification information of the user to the external device 10 in operation S325. Meanwhile, if the user ID and the password corresponding to the user ID received are pre-registered and it is identified that the user has authority to transmit data, the cloud server 100 may transmit identification information of the user to the external device 10 in operation S330.

Then, the external device 10 may transmit a request signal of preparation for data transmission and the identification information of the user to the cloud server 100 in operation S340. When the request signal of preparation for data transmission and the identification information of the user are received, the cloud server 100 may acquire security data corresponding to the identification information through one of the plurality of security modules in operation S350. Specifically, the cloud server 100 may determine one security module to output security data based on the state information of the plurality of respective security modules (e.g., the traffic and resource usage ratios of the plurality of respective security modules, whether an error occurred, etc.). Then, the cloud server 100 may acquire security data corresponding to the identification information by using the determined one security module among the plurality of security modules.

Then, the cloud server 100 may store the security data in the security data storage area in the storage device in operation S360. Then, the cloud server 100 may transmit the security data corresponding to the identification information to the external device 10 in operation S370. Meanwhile, the operation according to the operation S360 and the operation according to the operation S370 may be performed at the same time or within a threshold time regardless of the order. As another example, the cloud server 100 may perform the operation according to the operation S370, and then perform the operation according to the operation S360.

Meanwhile, the external device 10 may transmit data to be stored in the cloud server 100 and security data to the cloud server 100 in operation S380. Here, the external device 10 may transmit the data to be stored in the cloud server 100 and the security data together with identification information to the cloud server 100. Then, the cloud server 100 may authenticate the user based on the received security data and the stored security data by using at least one of the plurality of security modules, and store the data to be stored in the cloud server in the storage device in operation S390.

Specifically, the cloud server 100 may determine at least one of the plurality of security modules. For example, the cloud server 100 may determine at least one security module based on the state information of the plurality of respective security modules. Then, the cloud server 100 may authenticate the user of the external device 10 by using the determined at least one security module. For example, through the determined at least one security module, the cloud server 100 may load security data corresponding to the received identification information stored in the security data storage area, and match the loaded security data and the security data received from the external device 10, and authenticate the user. In case the security data stored in the storage device and the security data received from the external device 10 are matched, the cloud server 100 may identify that the user of the external device was authenticated. Then, through the at least one security module, the cloud server 100 may encrypt the data to be stored in the cloud server 100, and store the encrypted data in the storage device.

Figure 4:
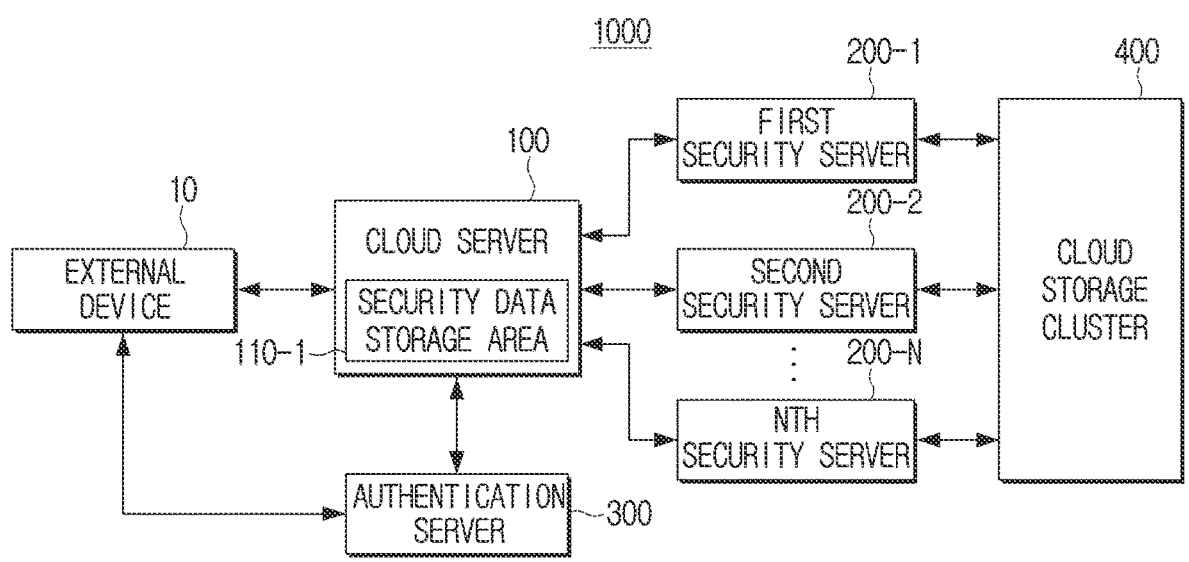
FIG. 4 is a diagram for illustrating an operation of a cloud system according to an embodiment of the disclosure.

FIG. 4 is a diagram for illustrating an operation of a cloud system according to an embodiment of the disclosure.

Referring to FIG. 4, a cloud system 1000 may include an external device 10, a cloud server 100, a plurality of security servers 200-1, 200-2, . . . 200-N, an authentication server 300, and a cloud storage cluster 400. The cloud server 100, the plurality of security servers 200-1, 200-2, . . . 200-N, the authentication server 300, and the cloud storage cluster 400 may respectively perform connection of communication via wire/wirelessly. Then, the external device 10 and the cloud server 100 or the authentication server 300 may perform connection of communication wirelessly. Here, each security server may be an SFTP server, but this is merely an embodiment, and each security server may be implemented as a server that can use various types of transmission protocols.

Meanwhile, in FIG. 4, it is illustrated that the security data storage area 110-1 is included in the cloud server 100, but this is merely an embodiment. That is, the security data storage area 110-1 may be included in a separate device, and the separate device may be communicatively connected with the cloud server 100 and the plurality of security servers 200-1, 200-2, . . . 200-N wirelessly or via wire.

When a request signal of user authentication is received from the external device 10, the authentication server 300 may identify whether the user of the external device has authority to transmit data. Specifically, in the request signal of user authentication, a user ID and a password corresponding to the user ID pre-registered in the authentication server 300 may be included. That is, the pre-registered user ID and the password thereof stored in the authentication server 300 are the ID of a user who has authority to store various kinds of data in the cloud server 100 or the cloud system 1000, and a password corresponding thereto. The authentication server 300 may identify whether the user ID and the password thereof included in the request signal of user authentication are pre-registered.

The pre-registered user ID and the password corresponding thereto stored in the authentication server 300 may be the ID of a user who can store various kinds of data in the cloud server 100 or the cloud system 1000, and a password corresponding thereto. In case the user ID and the password corresponding thereto received from the external device 10 are pre-registered, the authentication server 300 may identify that the user of the external device 10 has authority to transmit data. Then, the authentication server 300 may generate identification information of the user identified to have authority to transmit data, and transmit the generated identification information to the external device 10.

When the request signal of preparation for data transmission and the identification information of the user of the external device 10 are received from the external device 10, the cloud server 100 may transmit the identification information to one of the plurality of security servers 200-1, 200-2, . . . 200-N. Specifically, the cloud server 100 may identify the state information of the plurality of security servers connected via wire/wirelessly, and determine the security server to output the security data based on the identified state information of the plurality of security servers. Then, the cloud server 100 may transmit the identification information to the determined security server. If it is assumed that the first security server 200-1 was determined, the first security server 200-1 may generate security data corresponding to the identification information. For example, the first security server 200-1 may randomly generate security data corresponding to the identification information by using a REST API module. Specifically, the first security server 200-1 may randomly generate security data corresponding to the identification information by using a REST API module.

Then, the first security server 200-1 may transmit the security data to the cloud server 100 including the security data storage area 110-1. The cloud server 100 may store the security data in the allotted security data storage area so that the plurality of security servers can share the security data. Accordingly, the plurality of security servers 200-1, 200-2, . . . 200-N can share the security data with one another. Then, the cloud server 100 may transmit the security data to the external device 10.

When the data to be stored in the cloud storage cluster 400 and the security data are received from the external device 10, the cloud server 100 may transmit the data to be stored in the cloud storage cluster 400 and the security data received from the external device 10 to at least one security server among the plurality of security servers. For example, the cloud server 100 may transmit a first part of the data to be stored in the cloud storage cluster 400 to the first security server 200-1, and transmit a second part to the second security server 200-2 among the plurality of security servers. The first security server 200-1 and the second security server 200-2 may authenticate the user by using the security data stored in the cloud server 100 or the security data storage area 110-1 of a separate device connected via wire/wirelessly. Specifically, the first security server 200-1 and the second security server 200-2 may respectively access the security data storage area and load the stored security data corresponding to the identification information.

Then, the first security server 200-1 and the second security server 200-2 may authenticate the user based on the loaded security data and the security data received from the external device 10. As the method for a security server to authenticate a user by using security data was described earlier, overlapping explanation will be omitted.

When the user of the external device 10 is authenticated, the first security server 200-1 and the second security server 200-2 may store the encrypted data in the cloud storage cluster 400 connected via wire/wirelessly. Then, when the encrypted data is stored in the cloud storage cluster 400, the cloud server 100 may delete the identification information of the user of the external device 10 and the security data corresponding to the identification information stored in the security data storage area 110-1, and transmit a signal requesting to delete the security data to the first security server 200-1 and the second security server 200-2. Accordingly, the first security server 200-1 and the second security server 200-2 may delete the identification information and the security data corresponding thereto that were stored.

Figure 5:
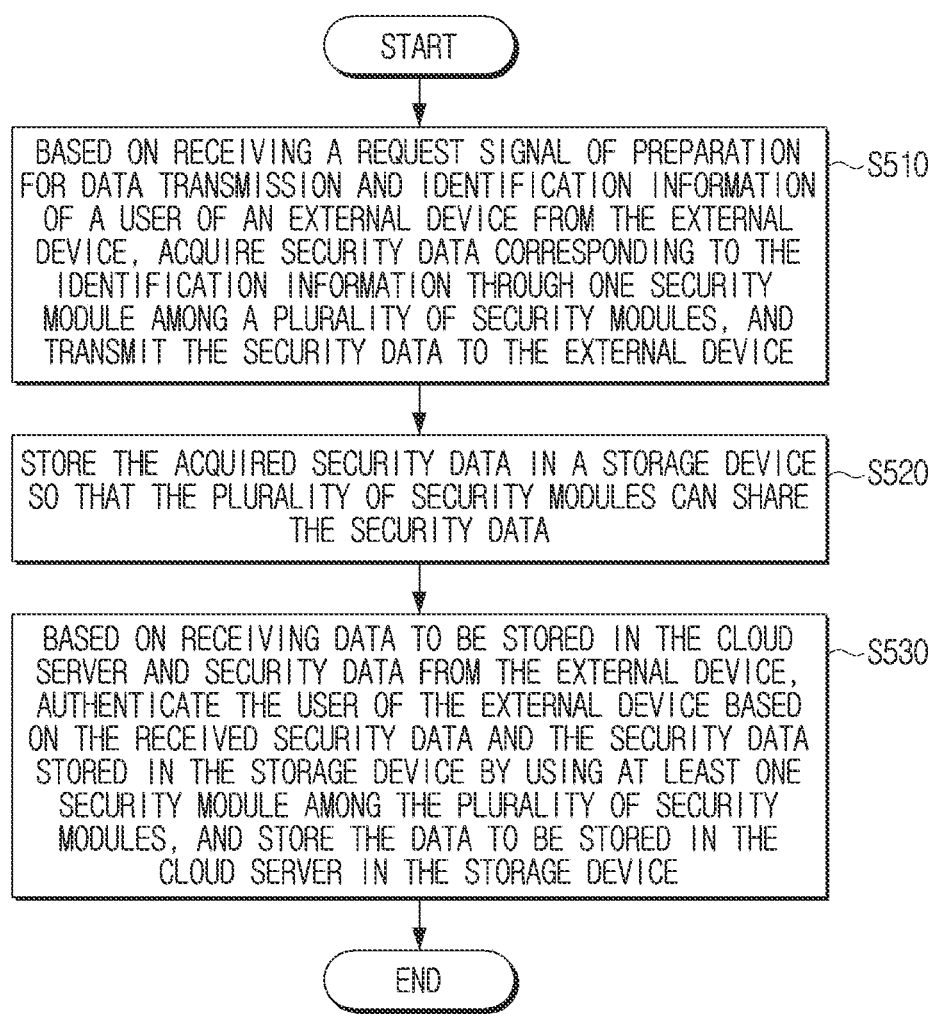
FIG. 5 is a flow chart for illustrating a method for controlling a cloud server according to an embodiment of the disclosure.

FIG. 5 is a flow chart for illustrating a method for controlling a cloud server according to an embodiment of the disclosure.

Referring to FIG. 5, when a request signal of preparation for data transmission and identification information of a user of an external device are received from an external device, a cloud server 100 may acquire security data corresponding to identification information through one security module among a plurality of security modules, and transmit the security data to the external device in operation S510. Specifically, the cloud server 100 may determine a security module to output security data corresponding to the identification information among the plurality of security modules based on the state information of the plurality of respective security modules (e.g., the traffic amounts of the plurality of respective security modules, whether an error exists, whether resources are used, etc.). Then, the cloud server 100 may acquire security data corresponding to the identification information by using the determined security module.

Then, the cloud server 100 may store the acquired security data in a storage device such that the plurality of security modules can share the security data in operation S520. The storage device may include a security data storage area allotted so that the plurality of security modules can share the security data. Accordingly, the cloud server 100 may store the acquired security data in the security data storage area in the storage device, and thereby make the plurality of respective security modules share the security data.

Then, when data to be stored in the cloud server and security data are received from the external device, the cloud server 100 may authenticate the user of the external device based on the received security data and the security data stored in the storage device by using at least one security module among the plurality of security modules, and store the data to be stored in the cloud server in the storage device in operation S530. Specifically, the cloud server 100 may authenticate the user of the external device based on whether the security data received from the external device and the security data stored in the storage device are matched by using at least one security module. For example, in case the security data stored in the storage device and the received security data are matched, the cloud server 100 may identify that the user of the external device was authenticated.

Meanwhile, it should be noted that the drawings accompanying the disclosure are not for limiting the technology described in the disclosure to a specific embodiment, but they should be interpreted to include various modifications, equivalents, and/or alternatives of the embodiments of the disclosure. Also, with reference to the detailed description of the drawings, similar components may be designated by similar reference numerals.

Further, in the disclosure, expressions such as "have," "may have," "include," and "may include" denote the existence of such characteristics (e.g.: elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Also, the expressions "first," "second" and the like used in the disclosure may be used to describe various elements regardless of any order and/or degree of importance. In addition, such expressions are used only to distinguish one element from another element, and are not intended to limit the elements.

Further, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

In addition, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Meanwhile, an external device according to the various embodiments of the disclosure may include, for example, at least one of a smartphone, a tablet PC, a desktop PC, a laptop PC, a netbook computer, a server, a PDA, a medical device, or a wearable device. In some embodiments, the external device may include, for example, at least one of a television, a refrigerator, an air conditioner, an air purifier, a set-top box, or a media box (e.g.: Samsung HomeSync™, Apple TV™, or Google TV™).

Also, the various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include a cloud server according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily. For example, 'a non-transitory storage medium' may include a buffer wherein data is temporarily stored.

In addition, according to an embodiment of the disclosure, methods according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cloud server comprising a plurality of security modules, the cloud server further comprising:
   a communicator comprising a circuit;
   a storage device that can be accessed by the plurality of security modules; and at least one processor configured to:
  based on receiving a request signal of preparation for data transmission and identification information of a user of an external device from the external device through the communicator, acquire first security data corresponding to the identification information through one security module among the plurality of security modules, and control the communicator to transmit the first security data to the external device,
  store the first security data in the storage device so that the plurality of security modules can share the first security data, and
  based on receiving data to be stored in the cloud server and second security data from the external device through the communicator, authenticate the user of the external device based on the second security data and the first security data stored in the storage device by using at least one security module among the plurality of security modules, and store the data to be stored in the cloud server in the storage device,
wherein the at least one processor is further configured to:
  based on the plurality of respective security modules being included in external servers, control the communicator to transmit the identification information to a first external server including one security module among the plurality of security modules,
  receive the first security data corresponding to the identification information from the first external server through the communicator, and store the first security data in the storage device, and
  control the communicator to transmit the first security data to the external device.

2. The cloud server of claim 1,
wherein the storage device comprises a security data storage area allotted so that the plurality of security modules can share the first security data, and
wherein the at least one processor is further configured to:
  store the first security data in the security data storage area.

3. The cloud server of claim 1, wherein the at least one processor is further configured to:
  based on state information of the plurality of respective security modules, determine a security module to output the first security data corresponding to the identification information among the plurality of security modules, and
  acquire the first security data corresponding to the identification information by using the determined security module.

4. The cloud server of claim 1, wherein the at least one processor is further configured to:
  by using the at least one security module, authenticate the user of the external device based on whether the second security data received from the external device and the first security data stored in the storage device are matched.

5. The cloud server of claim 4, wherein the at least one processor is further configured to:
  based on the first security data stored in the storage device and the second security data being matched, identify that the user of the external device was authenticated, and
  encrypt the data to be stored in the cloud server through the at least one security module, and store the encrypted data in the storage device.

6. The cloud server of claim 5, wherein the at least one processor is further configured to:
  based on storing the encrypted data in the storage device, remove the first security data stored in the storage device.

7. The cloud server of claim 1, wherein the at least one processor is further configured to:
  based on receiving the second security data and the data to be stored in the cloud server from the external device through the communicator, control the communicator to transmit the second security data and the data to be stored in the cloud server received from the external device to a second external server including at least one of the plurality of security modules, and
  receive data encrypted by at least one of the plurality of security modules based on the first security data stored in the storage device from the second external server, and store the received encrypted data in the storage device.

8. The cloud server of claim 1, wherein the at least one processor is further configured to:
  based on receiving a request signal of user authentication from the external device through the communicator, identify whether the user of the external device has authority to transmit data, and
  based on identifying that the user of the external device has the authority to transmit data, control the communicator to transmit identification information of the user to the external device.

9. The cloud server of claim 1, wherein the plurality of respective security modules comprise modules using Secure File Transfer Protocol (SFTP).

10. A method for controlling a cloud server, the cloud server comprising a plurality of security modules, and a storage device that can be accessed by the plurality of security modules, the method comprising:
  based on receiving a request signal of preparation for data transmission and identification information of a user of an external device from the external device, acquiring first security data corresponding to the identification information through one security module among the plurality of security modules, and transmitting the first security data to the external device;
  storing the first security data in the storage device so that the plurality of security modules can share the security data; and
  based on receiving data to be stored in the cloud server and second security data from the external device, authenticating the user of the external device based on the second security data and the first security data stored in the storage device by using at least one security module among the plurality of security modules, and storing the data to be stored in the cloud server in the storage device,
wherein the acquiring of the first security data comprises:
  based on the plurality of respective security modules being included in external servers, transmitting the identification information to a first external server including one security module among the plurality of security modules,
  receiving the first security data corresponding to the identification information from the first external server through the communicator, and
wherein the storing the first security data comprises storing the first security data in the storage device, and transmitting the first security data to the external device.

11. The controlling method of claim 10,
wherein the storage device comprises a security data storage area allotted so that the plurality of security modules can share the security data, and
wherein the storing of the security data comprises:
storing the first security data in the security data storage area.

12. The controlling method of claim 10, wherein the transmitting comprises:
based on state information of the plurality of respective security modules, determining a security module to output the first security data corresponding to the identification information among the plurality of security modules; and
acquiring the first security data corresponding to the identification information by using the determined security module.

13. The controlling method of claim 10, wherein the authenticating the user of the external device comprises:
by using the at least one security module, authenticating the user of the external device based on whether the second security data received from the external device and the first security data stored in the storage device are matched.

14. The controlling method of claim 13,
wherein the authenticating the user of the external device comprises:
based on the first security data stored in the storage device and the second security data being matched, identifying that the user of the external device was authenticated, and
wherein the storing of the data to be stored in the cloud server in the storage device comprises:
encrypting the data to be stored in the cloud server through the at least one security module, and storing the encrypted data in the storage device.

* * * * *